United States Patent
Allert et al.

(10) Patent No.: US 7,905,029 B2
(45) Date of Patent: Mar. 15, 2011

(54) ADJUSTMENT DEVICE FOR THE ALIGNMENT OF SUPPORTING PARTS ON STRUCTURES HAVING INHERENT DIMENSIONAL TOLERANCES

(75) Inventors: Torben Allert, Bremen (DE); Jens Krüger, Schönebeck (DE)

(73) Assignee: Airbus Deutschland GmbH, Hamburg (DE)

( * ) Notice: Subject to any disclaimer, the term of this patent is extended or adjusted under 35 U.S.C. 154(b) by 444 days.

(21) Appl. No.: 11/906,019

(22) Filed: Sep. 28, 2007

(65) Prior Publication Data

US 2008/0083129 A1 Apr. 10, 2008

(30) Foreign Application Priority Data

Oct. 4, 2006 (DE) .................... 10 2006 047 237

(51) Int. Cl.
*G01B 21/22* (2006.01)
(52) U.S. Cl. .......................... 33/533; 33/645
(58) Field of Classification Search ............ 33/645, 33/613
See application file for complete search history.

(56) References Cited

U.S. PATENT DOCUMENTS

| | | | |
|---|---|---|---|
| 2,887,070 A | 5/1959 | Terlecky et al. | |
| 3,092,043 A * | 6/1963 | Tobin | 410/145 |
| 3,125,035 A | 3/1964 | Loomis | |
| 3,878,806 A * | 4/1975 | Garcia | 114/77 R |
| 3,966,075 A * | 6/1976 | Schultz | 220/1.5 |
| 4,753,615 A * | 6/1988 | Weidler et al. | 439/775 |
| 4,788,026 A * | 11/1988 | Widener | 33/534 |
| 5,013,197 A | 5/1991 | Allaert et al. | |
| 5,230,485 A * | 7/1993 | Vogg et al. | 244/118.2 |
| 5,234,297 A * | 8/1993 | Wieck et al. | 410/77 |
| 5,308,202 A | 5/1994 | Tatina | |
| 5,597,084 A * | 1/1997 | Parasin | 220/4.28 |
| 5,846,042 A | 12/1998 | Iannuzzi | |
| 6,000,888 A | 12/1999 | Hartman | |
| 6,530,674 B2 * | 3/2003 | Grierson et al. | 362/219 |
| 6,578,902 B2 * | 6/2003 | Sill | 296/186.1 |
| 7,086,815 B2 * | 8/2006 | Bruns | 410/107 |
| 7,100,299 B2 * | 9/2006 | Jensen et al. | 33/645 |
| 7,201,550 B2 * | 4/2007 | Borrmann et al. | 410/102 |
| 7,214,015 B2 * | 5/2007 | Bruns | 410/102 |
| 7,406,777 B2 * | 8/2008 | Grover et al. | 33/645 |
| 7,469,478 B2 * | 12/2008 | Mitterreiter | 33/1 PT |
| 2002/0180238 A1 * | 12/2002 | Sill | 296/181 |
| 2004/0265087 A1 * | 12/2004 | Bruns | 410/107 |
| 2008/0083849 A1 * | 4/2008 | Allert et al. | 244/118.2 |
| 2008/0089756 A1 * | 4/2008 | Allert et al. | 410/80 |
| 2009/0229105 A1 * | 9/2009 | Schubetzer | 29/445 |
| 2010/0154236 A1 * | 6/2010 | Hall | 33/645 |

* cited by examiner

Primary Examiner — Yaritza Guadalupe-McCall
(74) Attorney, Agent, or Firm — Collard & Roe, P.C.

(57) ABSTRACT

In an adjustment device for the alignment of supporting parts on structures having inherent dimensional tolerances, in particular in an aircraft fuselage, by means of joining surfaces, the joining surfaces form positive shapes and negative shapes corresponding with one another in a form fit. The positive shapes and the negative shapes in each case are arranged in a cross grid.

9 Claims, 3 Drawing Sheets

ADJUSTMENT DEVICE FOR THE ALIGNMENT OF SUPPORTING PARTS ON STRUCTURES HAVING INHERENT DIMENSIONAL TOLERANCES

CROSS REFERENCE TO RELATED APPLICATIONS

Applicants claim priority under 35 U.S.C. 119 of German Application No. 10 2006 047 237.3 filed Oct. 4, 2006.

BACKGROUND OF THE INVENTION

1. Field of the Invention

The invention concerns an adjustment device for the alignment of supporting parts on structures having inherent dimensional tolerances, in particular in an aircraft fuselage, by means of joining surfaces.

2. The Prior Art

Various components are guided and secured in predetermined tracks on supporting parts in a manner of known art. Depending on the kind of components to be retained by the supporting parts, for example a guide rail, the supporting parts must be aligned with each other with a specification of tight dimensional tolerances. In order to ensure a reliable and enduring alignment of the supporting parts within systems subjected to vibration, the attachment of the supporting parts to the structures having inherent dimensional tolerances takes place by means of form or material connections. However, these have the disadvantage that adjustment tasks as well as any later fine alignments on the supporting parts are either not possible at all, or are only possible with a large amount of effort.

SUMMARY OF THE INVENTION

The object of the invention is to identify an adjustment device of the genus cited in the introduction, with which adjustment and alignment tasks on the supporting parts are simplified.

This object is achieved according to the invention with an adjustment device for the alignment of supporting parts on structures having inherent dimensional tolerances, in particular in an aircraft fuselage by means of joining surfaces, wherein the joining surfaces form positive shapes and negative shapes corresponding with one another in a form fit and the positive shapes and the negative shapes in each case are arranged in a cross grid. Advantageous further embodiments of the invention are discussed below.

The adjustment device according to the invention is distinguished by the fact that the joining surfaces form positive shapes and negative shapes corresponding with one another in a form fit, and that the positive shapes and negative shapes in each case are arranged in a cross grid. By the joining together of a joining surface having positive shapes with a joining surface having negative shapes a form connection is created acting parallel to the surface planes of the cross grid. With the form connection any sliding movements between the joining surfaces caused by vibrations are advantageously prevented. The positive shapes and negative shapes in each case represent individual pixels within their cross grid, so that the smallest possible adjustment travel between two joining surfaces is determined by the base size of the individual positive and negative shapes. Adjustment and alignment tasks can thus be carried out particularly simply by the movement apart of the joining surfaces, by a desired adjustment movement parallel to the surface planes of the cross grid, and then by the rejoining together of the joining surfaces. Joining surfaces of this kind can also be arranged between the components and the supporting parts, so that further alignment and adjustment options ensue for the components.

According to a first further development of the invention each positive shape is formed as a pointed body. Thus with the joining together of the joining surfaces a self-centring takes place from the target optimal position into the adjustment position lying next to the optimal position. With a pointed body any mutual support of two joining surfaces apart from a form fit is advantageously prevented.

According to a next further development of the invention each positive shape is formed as a pyramid with a rectangular base. The design as a rectangular pyramid represents a particularly simple form of embodiment from production technology considerations. However, it is particularly preferred if provision is made that the pyramid is designed with a quadratic base.

In analogy to the design of the positive shape the negative shape is formed as a cavity. Here it is indispensable for the invention that the cross grid of the cavities corresponds exactly to the cross grid of the pointed bodies.

It is furthermore recommended that each negative shape is formed as a funnel with a rectangular cross-section surface. With the joining together of a joining surface forming negative shapes with a profile surface forming positive shapes the pyramid walls essentially lie against the funnel walls in a form fit, such that a secure form connection is advantageously created.

According to another further development of the invention each joining surface has at least one screw retainer, arranged approximately at the center of gravity of the surface. The retainer is, for example, formed as a hole or as a slot, and serves to guide screws through the surface; via the screws' threads form connections produced between the joining surfaces at right angles to the surface plane of the cross grid are likewise secured in a form fit. Such a securing can in principle also take place via rivets, adhesives or weld seams. However, screwed connections have the advantage that they can be released and thus also make possible any later adjustment of the supporting parts.

In order to make possible an adjustment capability of the supporting parts parallel to the surface planes of the cross grid, the screw retainers of the joining surfaces forming the positive shapes have a size other than that of the screw retainers of the joining surfaces forming the negative shapes. Preferably the larger screw retainer is in each case assigned to the supporting part, wherein the maximum adjustment travel of the adjustment device according to the invention is defined via the size difference of the screw retainers. Thus the maximum adjustment range is defined by the screw shaft impacting the interior surfaces of the screw retainers arranged in the supporting parts. Depending on the size of the adjustment range and depending on the design of the screw head it can be necessary to increase the seating surface of the screw head by means of appropriate washers.

According to a particularly advantageous further development of the invention provision is made that the joining surfaces on the supporting parts and/or on the structures having inherent dimensional tolerances are formed in one piece.

The one-piece feature ensures a particularly high level of security against unintentional alterations in position of the supporting parts relative to the structures having inherent dimensional tolerances. However, It is also within the framework of the invention that the joining surfaces are formed on separate plate elements, which in each case are fixed to the supporting parts and/or to the structures having inherent dimensional tolerances via at least one form connection or a material connection. For the adjustment device according to the invention suitable form connections are, in particular, screwed connections or releasable latched connections. The possibility also exists of providing additional plate elements, which have on one side the joining surfaces forming positive shapes and on the other side the joining surfaces forming negative shapes. By maintaining a store of such kinds of plate elements with varying thicknesses, adjustment and alignment tasks can advantageously also be carried out at right angles to the surface planes of the cross grid by selecting one or a plurality of plate elements with a predetermined thickness, and by arranging the selected plate elements between the joining surfaces of supporting parts and structures having inherent dimensional tolerances.

Independent protection is claimed for an aircraft that makes use of the adjustment device according to the invention. Aircraft are particularly predestined for the use of such kinds of adjustment devices, since their components, subjected to extreme levels of vibration, must satisfy the highest safety criteria.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
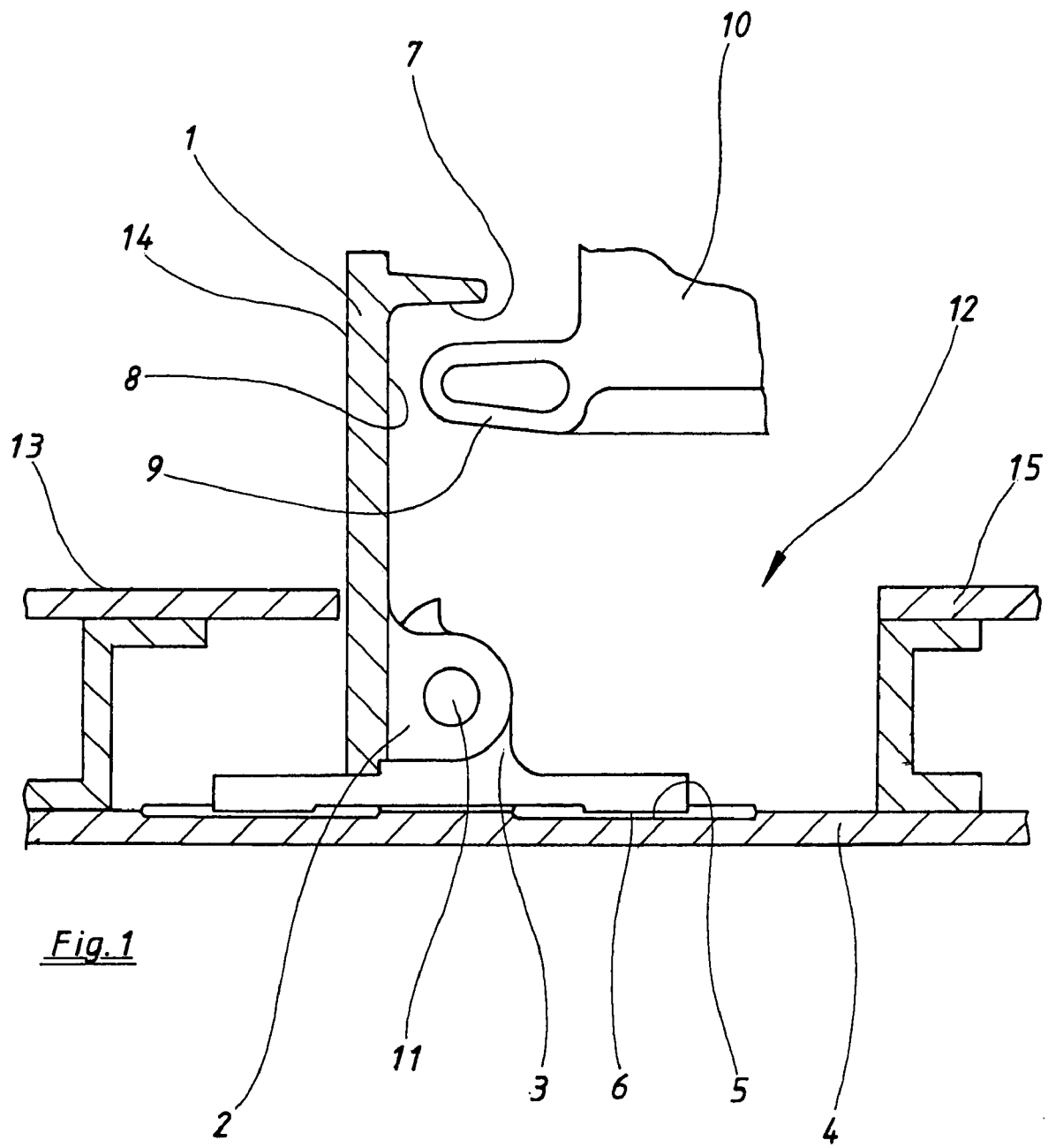
FIG. 1 shows a side view of the adjustment device according to the invention in an application example.

FIG. 1 shows a side view of the adjustment device according to the invention for the alignment of the supporting parts 2, 3 retaining the guide rail 1 of a freight loading system on structures 4 having inherent dimensional tolerances by means of joining surfaces 5, 6 corresponding with one another in a form fit. The guide rail 1 has guide surfaces 7, 8 for the guidance and securing of the runner 9 of a container 10. The supporting parts 2, 3 are connected to one another via a supporting bolt 11 in a pivoted joint, such that the guide rail 1 can be snapped into the space 12 and a plane freight loading surface is produced by the surface sections 13, 14, 15.

Figure 2:
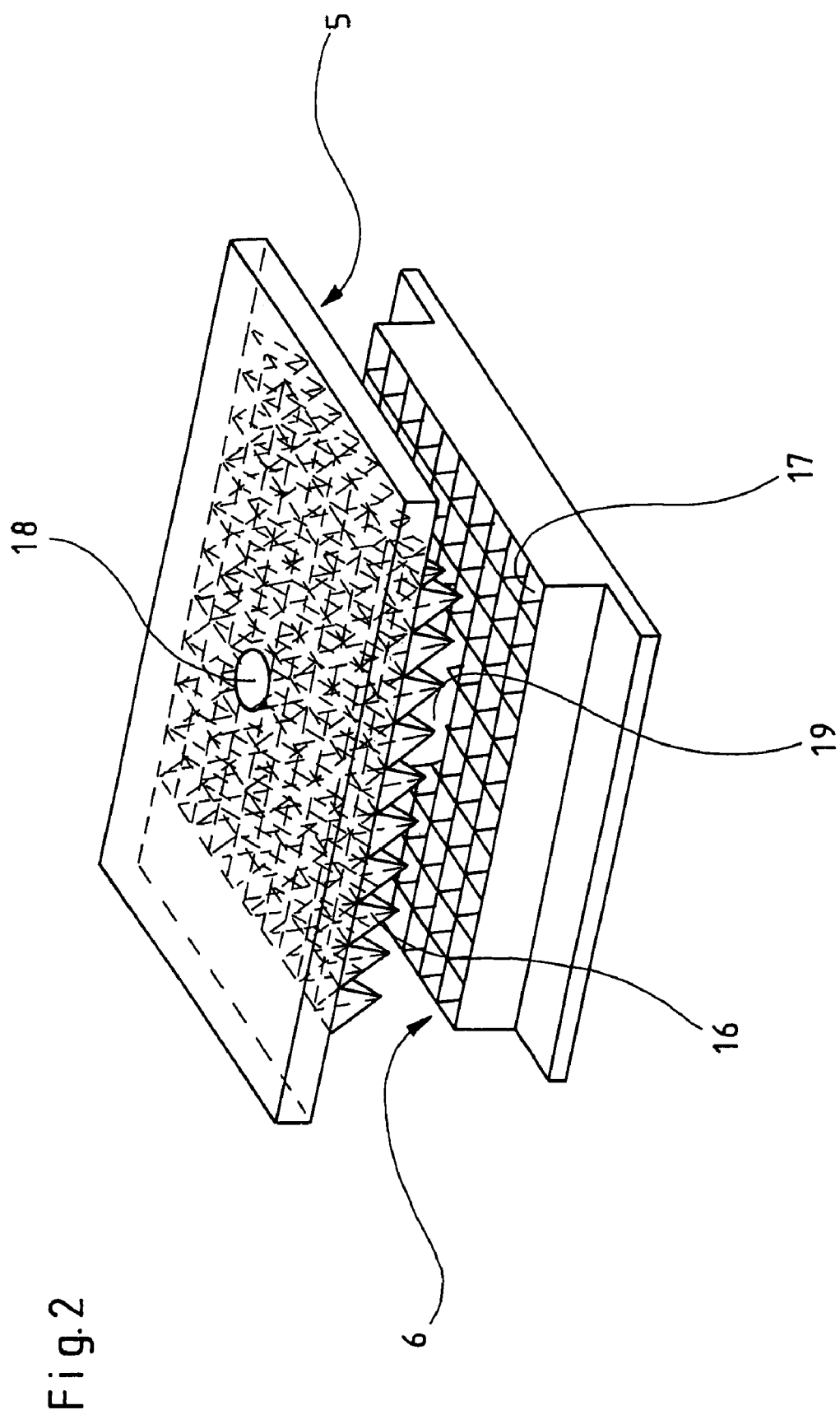
FIG. 2 shows a perspective scrap view of the joining surfaces for the adjustment device according to FIG. 1.

FIG. 2 shows a perspective scrap view of the joining surfaces 5, 6 for the adjustment device according to FIG. 1. The joining surfaces form positive shapes 16 and negative shapes 17 corresponding with one another in a form fit, which in each case are arranged in a cross grid. Each positive shape 16 is formed as a rectangular pyramid and each negative shape 17 is formed as a rectangular shaft. The joining surfaces 5, 6 have in each case a screw retainer 18, 19 arranged approximately at the center of gravity of their surfaces, wherein the screw retainer 18 of the joining surface 5 forming the positive shapes 16 is smaller than the screw retainer 19 of the joining surface 6 forming the negative shapes 17.

Figure 3:
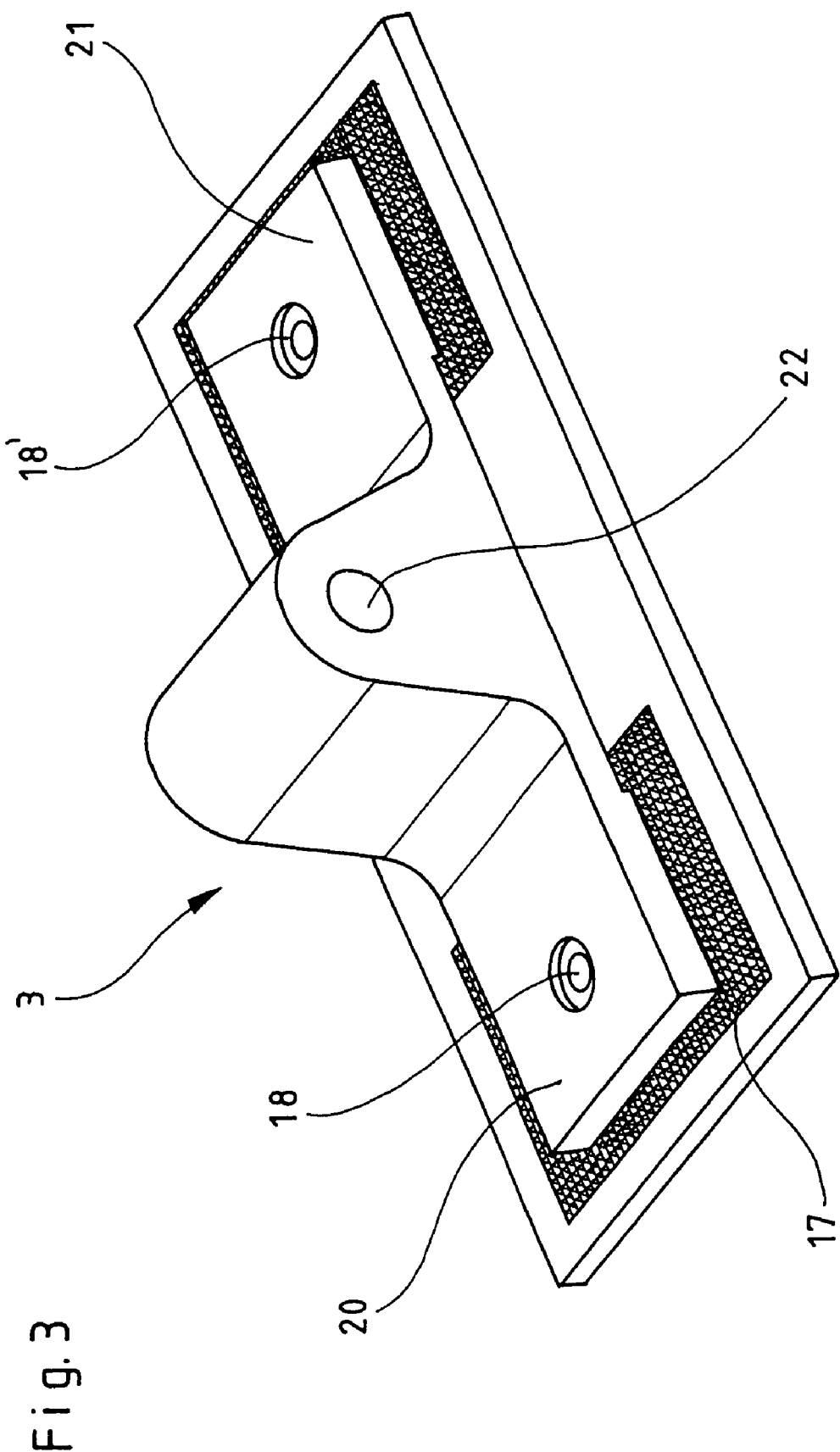
FIG. 3 shows a schematic scrap view of a supporting part for the adjustment device according to FIG. 1.

FIG. 3 shows a schematic scrap view of the supporting part 3 for the adjustment device according to FIG. 1. The supporting part 3 has two lugs 20, 21 on which in each case a joining surface is arranged with a screw retainer 18, 18' placed approximately at the center of gravity of the surface. A bored hole 22 arranged in the supporting part 3 serves to retain the supporting bolt 11 (see FIG. 1). The same elements are provided with the same reference numbers.

Although only at least one embodiment of the present invention has been shown and described, it is apparent that many changes and modifications may be made thereunto without departing from the spirit and scope of the invention.

What is claimed is:

1. An adjustment device for the alignment of supporting parts on structures having inherent dimensional tolerances in an aircraft fuselage, by means of joining surfaces, wherein a first joining surface comprises a plurality of positive shapes, each positive shape of the plurality of positive shapes being formed as a pointed body, and a second joining surface opposite the first joining surface comprises a plurality of negative shapes, each negative shape of the plurality of negative shapes being formed as a cavity, wherein the positive shapes engage corresponding negative shapes in a form fit, wherein the positive shapes and the negative shapes in each case are arranged in a cross grid for an adjustment movement parallel to a surface plane of the respective cross grid, and wherein the positive shapes and negative shapes in each case represent individual pixels within the respective cross grid, so that a smallest possible adjustment travel between the first joining surface and the second joining surface is determined by a base size of each positive shape and each negative shape.

2. The adjustment device according to claim 1, wherein each positive shape is formed as a pyramid with a rectangular base.

3. The adjustment device according to claim 1, wherein each negative shape is formed as a funnel with a rectangular base.

4. The adjustment device according to claim 1, wherein each joining surface has at least one screw retainer arranged approximately at a center of gravity of the surface.

5. The adjustment device according to claim 4, wherein the screw retainers of the joining surfaces having positive shapes have a size other than that of the screw retainers of the joining surfaces having negative shapes.

6. The adjustment device according to claim 1, wherein the joining surfaces on at least one of the supporting parts and the structures having inherent dimensional tolerances are formed in one piece.

7. The adjustment device according to claim 1, wherein the joining surfaces are formed on separate components, which in each case are fixed via at least one form connection to at least one of the supporting parts and the structures having inherent dimensional tolerances.

8. The adjustment device according to claim 1, wherein the joining surfaces are formed on separate components, which in each case are fixed via at least one material connection to at least one of the supporting parts and the structures having inherent dimensional tolerances.

9. An aircraft comprising an adjustment device for the alignment of supporting parts on structures having inherent dimensional tolerances in an aircraft fuselage via joining surfaces wherein a first joining surface comprises a plurality of positive shapes, each positive shape of the plurality of positive shapes being formed as a pointed body, and a second joining surface opposite the first joining surface comprises a plurality of negative shapes, each negative shape of the plurality of negative shapes being formed as a cavity, wherein the positive shapes engage corresponding negative shapes in a form fit, wherein the positive shapes and the negative shapes in each case are arranged in a cross grid for an adjustment movement parallel to a surface plane of the respective cross grid, and wherein the positive shapes and negative shapes in each case represent individual pixels within the respective cross grid, so that a smallest possible adjustment travel between the first joining surface and the second joining surface is determined by a base size of each positive shape and each negative shape.

* * * * *